June 16, 1925.
J. McALEAR ET AL
1,542,068
CONTROLLING DEVICE FOR HEATERS
Filed June 18, 1917
4 Sheets-Sheet 1
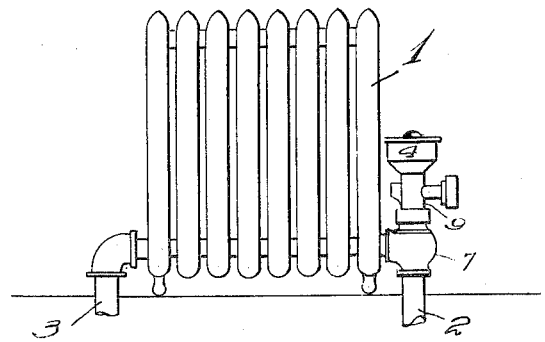
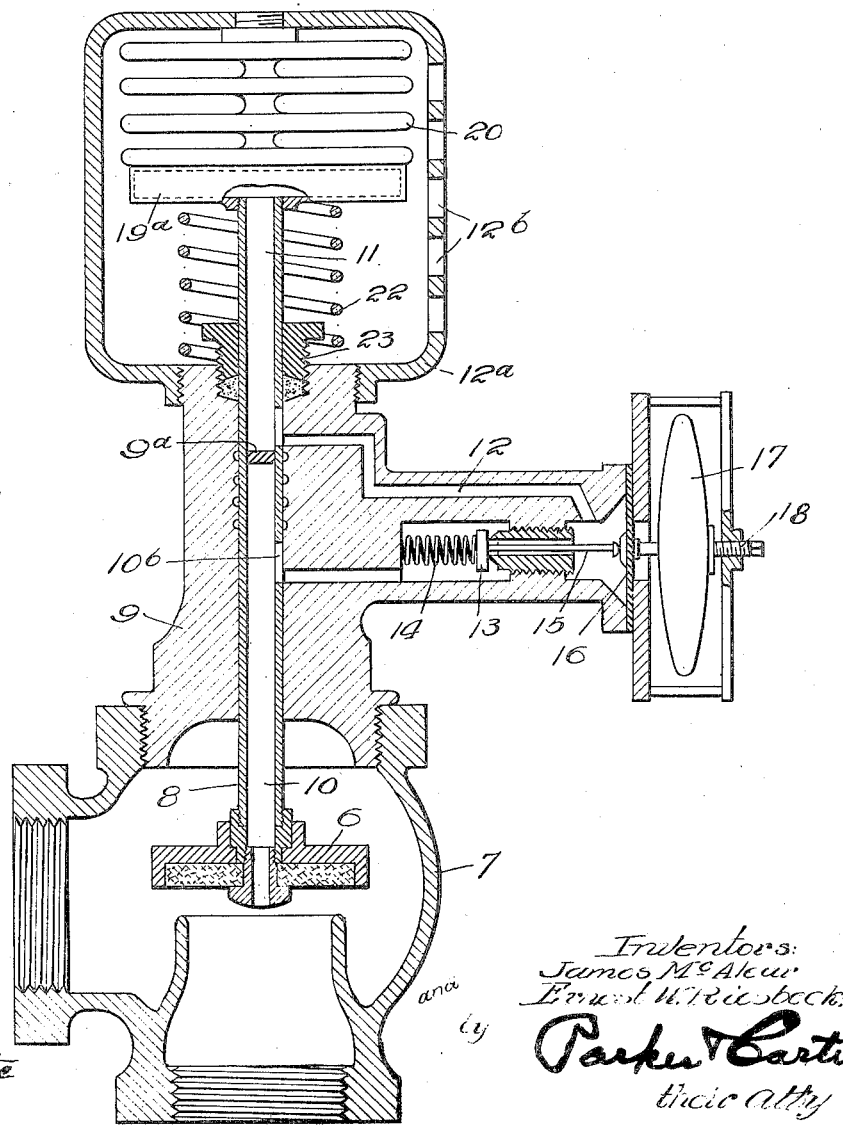
Inventors:
James McAlear
Ernest W. Riesbeck
by Parker & Carter
their Atty

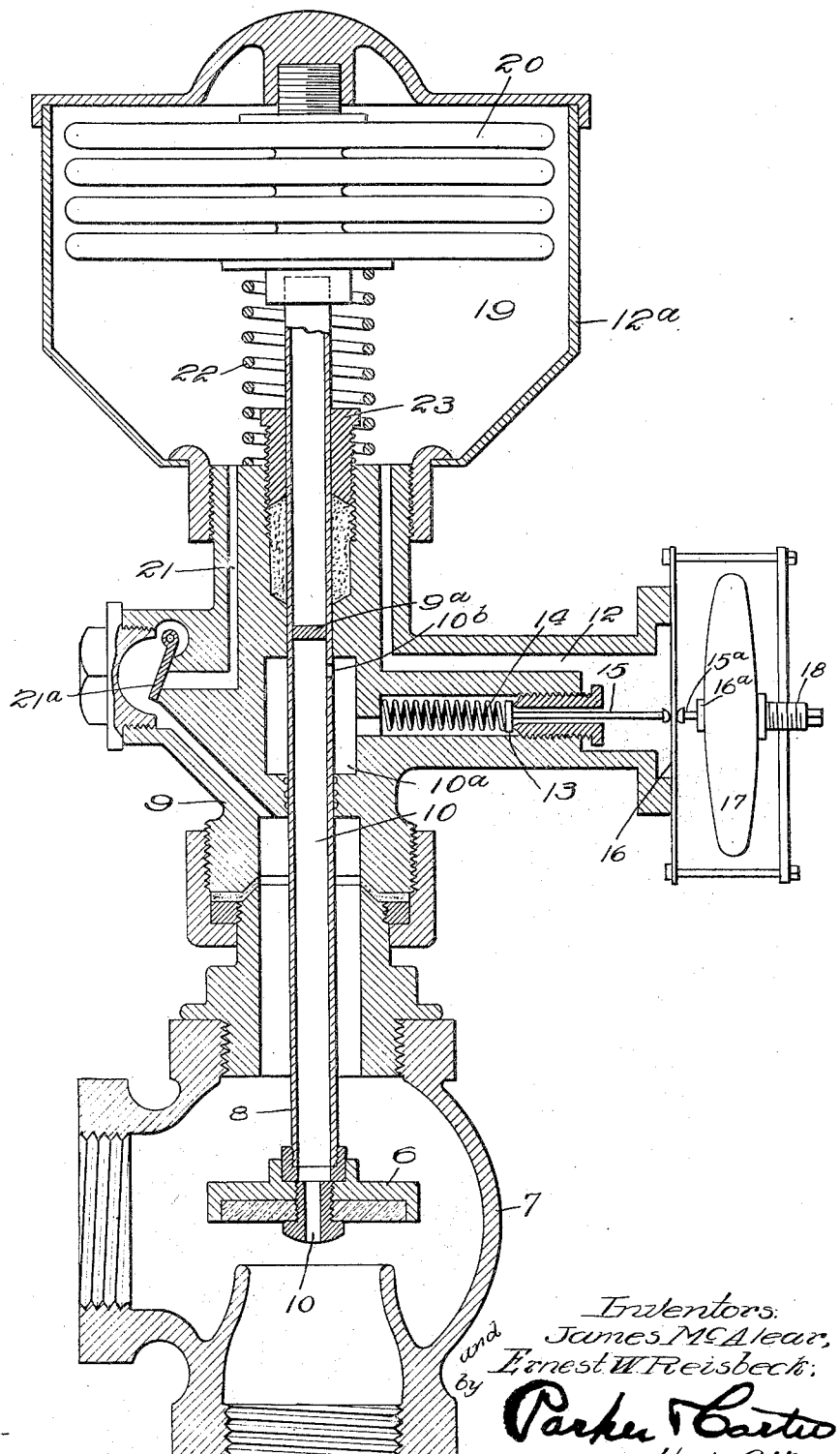

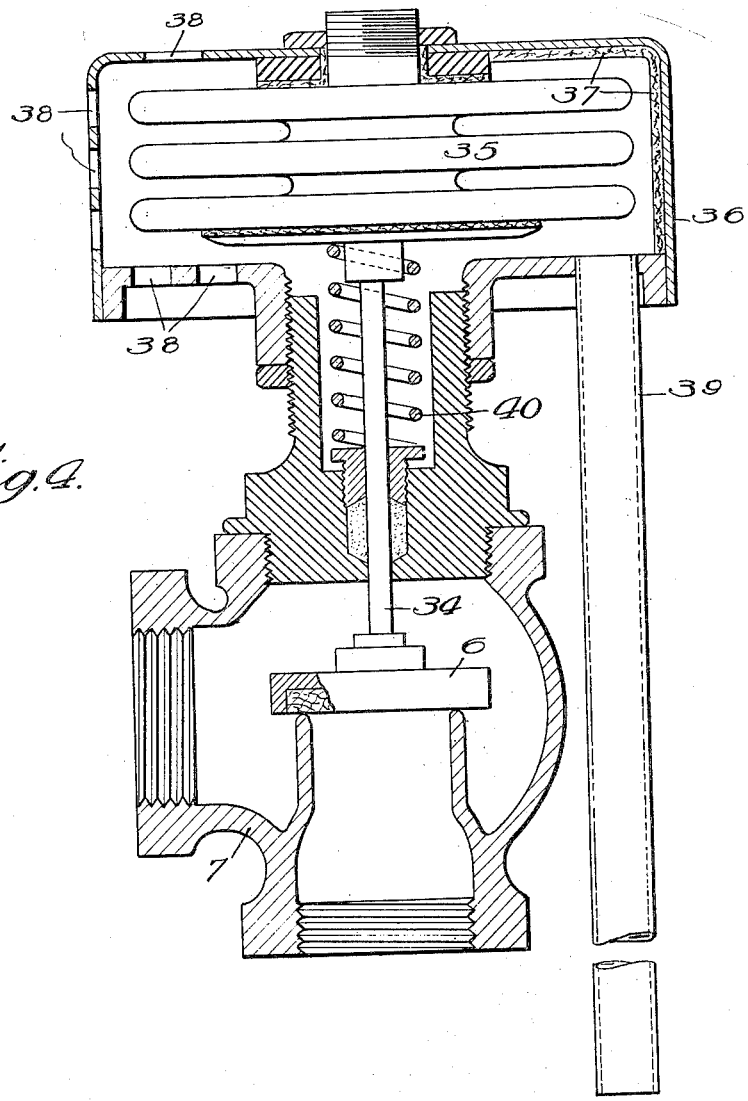

Patented June 16, 1925.

1,542,068

UNITED STATES PATENT OFFICE.

JAMES McALEAR AND ERNEST W. RIESBECK, OF CHICAGO, ILLINOIS, ASSIGNORS TO THE McALEAR MFG. CO., OF CHICAGO, ILLINOIS, A CORPORATION OF ILLINOIS.

CONTROLLING DEVICE FOR HEATERS.

Application filed June 18, 1917. Serial No. 175,392.

*To all whom it may concern:*

Be it known that we, JAMES McALEAR and ERNEST W. RIESBECK, citizens of the United States, residing at Chicago, in the county of Cook and State of Illinois, have invented certain new and useful Improvements in Controlling Devices for Heaters, of which the following is a specification.

This invention relates to controlling and regulating devices for heaters, and has for its object to provide a new and improved device whereby the heaters are independently and automatically controlled by automatically shutting off or admitting the heating fluid thereto.

The invention is illustrated in the accompanying drawings, wherein—

Fig. 1 is a view of a heater embodying the invention.

Fig. 2 is a sectional view through one form of controlling and regulating device.

Fig. 3 is a sectional view showing a modified construction of the controlling and regulating device.

Fig. 4 is a view showing a further modified construction of the controlling and regulating device.

Like numerals refer to like parts throughout the several figures.

Figure 5:
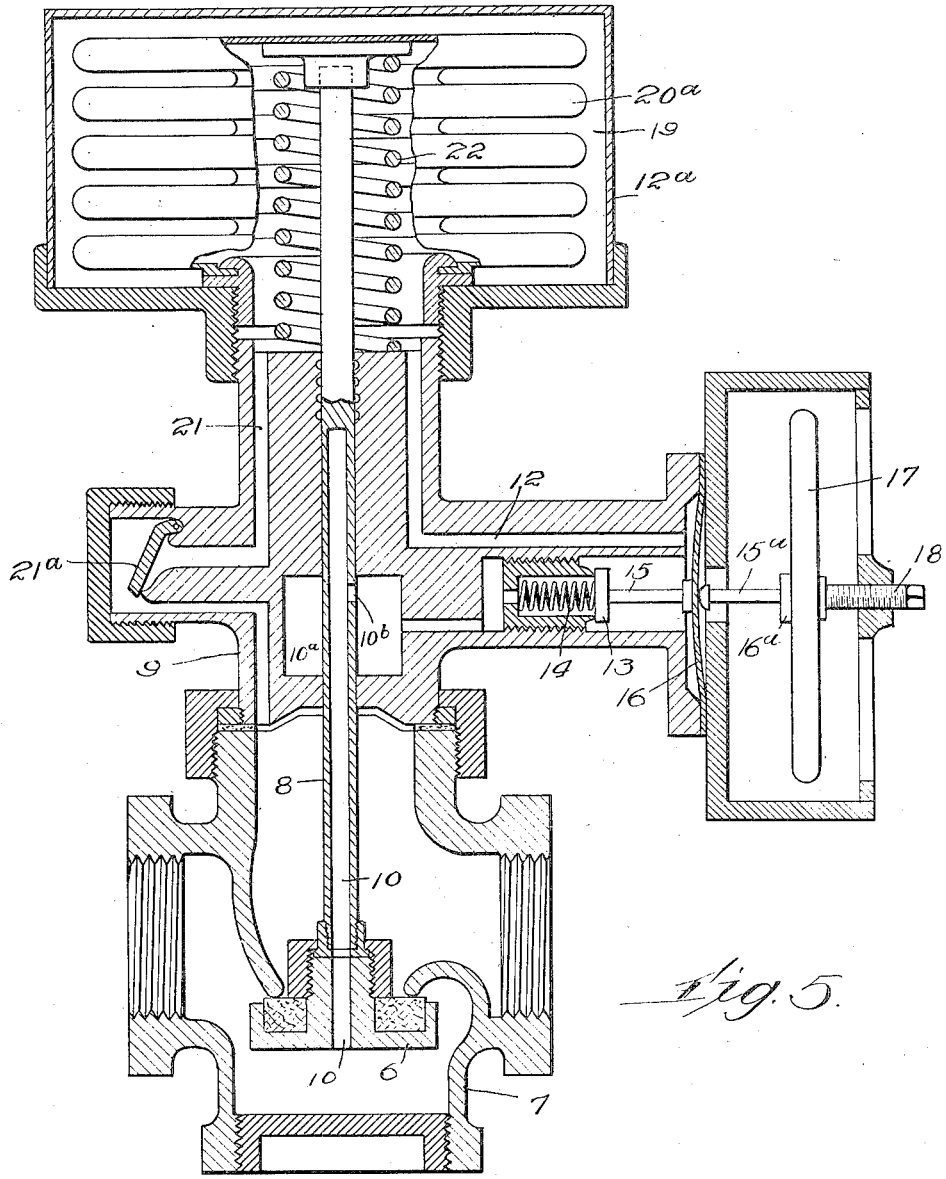
Fig. 5 is a view showing a further modified construction.

Referring now to the drawings, we have, in Fig. 1, shown a heater 1 having a supply pipe 2 and a return pipe 3, the supply pipe having connected therewith a controlling and regulating device 4. One form of this controlling and regulating device is illustrated in Fig. 2. In this construction the admission valve 6 which controls the admission of the heating fluid to the heater is located in the casing 7, which may be the ordinary valve casing now used. The valve 6 is provided with a hollow stem 8 which passes up through the removable casing section 9 which may be attached by screw threads to the casing 7. The stem 8 is provided with the partition or closed portion $9^a$ so as to provide it with a passageway for a portion of its length. This passageway is connected with the casing $12^a$ by a passageway 12 associated with the removable section 9. In order to permit the valve stem 8 to move longitudinally without disconnecting the passageway 10 and the passageway 12 we provide a chamber $10^a$ in the removable section, the passageway 12 connecting with this chamber. The valve stem is provided with an opening $10^b$ which is also connected with the chamber, and it will be seen, therefore, that the passageways 10 and 12 will be connected in all the various positions of the valve stem 8. Located in the passageway 12 is a valve 13 which controls said passageway, and which is normally held in its closed position in any desired manner as by means of the spring 14. This valve, as shown, is provided with a stem 15, which engages a flexible diaphragm 16. A piece $16^a$, preferably of insulating material, engages the thermostat and a piece $15^a$ extends from the piece $16^a$ to the diaphragm 16 or is arranged in a suitable manner so as to act upon the stem 15. This forms a connection between the stem 15 and the thermostatic device, the connection between the stem 15 and the thermostatic device being such that when the thermostatic device expands a predetermined amount, the valve stem and the valve 13 will be moved to open the passageway 12. This thermostatic device, as shown, consists of a receptacle 17 containing an expansible fluid and is mounted so that the temperature of the air in the apartment to be heated affects it so that when the temperature of said apartment reaches a predetermined amount, the fluid is expanded to move one side of the thermostatic device so as to move the valve stem 15. The other side of the thermostatic device may be held against movement by the adjustable stop 18, the thermostat being regulated by adjusting this stop so that the temperature at which it acts to open the valve 13 may be regulated. The diaphragm 16 and the insulating piece $16^a$ prevent the heat of the valve from being transmitted to the thermostat. When the temperature of the apartment rises to a predetermined degree so that the thermostat acts to open the valve 13, the heating fluid from the system, as for example, steam, is free to pass through the passageways 10 and 12 to the casing $12^a$ containing the thermostatic device 20 which in this case is shown as a disc containing fluid which expands when heated. This disc is connected with the casing $12^a$ attached to the removable section 9. When the heating fluid enters the casing $12^a$ it heats the material in the disc 20, and causes it to expand, and since the disc is flexible and is held against upward movement by being connected with the casing 12ª at the top, the pressure of the expanded material therein, causes it to move downwardly thus moving the valve stem 8 so as to move the valve 6 to its closed position.

When the valve is shut off the temperature in the apartment will gradually lower and the thermostat will be cooled and the valve 13 closed, whereupon the heating fluid is closed off from the heating chamber 19, which chamber then cools and the expansible material in the disc 20 also cools so that the disc contracts, the pressure therein being reduced. The spring 22 then moves the valve stem 8 so as to open the valve 6 to let the heating fluid enter the heater.

We prefer to provide the valve stem with a packing gland 23. When the temperature of the apartment is again raised to a predetermined amount, the thermostat 17 opens the valve 13 and the operation above described is repeated. Any water of condensation that may collect in the casing 12ª passes down through the passageway 21 and is returned to the boiler with the other water of condensation. The passageway 21 is provided with a check valve 21ª arranged to permit the passage of the water of condensation but to be normally closed so as to prevent heating fluid from passing therethrough into the casing 12ª. In Fig. 3 we have shown a modified construction similar to that shown in Fig. 2 except that the passageway 12, instead of passing directly into the casing 12ª, connects with the passageway 11 in the valve stem and there is a chamber 19ª associated with the thermostatic device 20, which chamber is located at the bottom of the thermostatic device. The heating fluid from passageway 11 enters chamber 19ª and heats the material in the thermostatic device or disc 20. In this construction the heating chamber 19ª may be made very small because the material in the disc 20 before it is expanded, will always be at the bottom and because this bottom rests upon the heating chamber 19ª, it will be seen that a maximum heating efficiency for any given amount of heating fluid is thus secured and that the heating chamber can be made very small so as to have a comparatively small radiating surface. Only a small amount of heating fluid is therefore necessary to actuate the device. This construction does not have the return passageway 21 as the water of condensation passes back through the same passageway that the steam enters. Disc 20 is cooled by air passing through openings 12ᵇ.

In Fig. 4 we have shown a further modified construction where an ordinary valve stem of any desired description 34, which is connected with the valve 6, is connected with a diaphragm 35 containing the expansible fluid. This diaphragm is contained in a casing 36 which is provided with insulation 37 at the side near the heater and with openings 38 at the other side for circulation of air. The casing 36 is provided with a pipe or tube 39 which communicates therewith and extends to a point near the floor of the apartment. It will be seen that by means of this construction air is taken into the pipe 39 from a point near the floor, and is circulated through the casing 36 so as to come in contact with the disc 35. The device is so adjusted that when the temperature of the air in the apartment near the floor reaches a predetermined amount, such air circulating in contact with the disc 35, will cause the expansible fluid to expand, thus expanding the disc and moving the valve stem 34 to close the valve 6. This shuts off the heating fluid from the heater and when the apartment has cooled so as to cool the disc sufficiently, it will contract and the spring 40 will move the valve stem to open the valve 6.

In Fig. 5 we have shown a construction similar to Fig. 2 with this difference, that instead of having a disc 20 containing the expansible material, we provide a flexible device 20ª with the expansible material outside of it and contained in the casing 12ª. The heating fluid passes from the passageway 12 into the interior of the flexible device 20ª and this heats the expansible material outside of the flexible device, and since it is confined in the casing 12ª, its expansion compresses the flexible device 20ª. The valve stem 8 is connected directly with the top of the flexible device. In this construction the return passageway 21 also communicates directly with the interior of the flexible device. In this construction the valve 6 opens by a downward movement and is closed by an upward movement which necessitates a construction where the valve 13 must be operated correspondingly and this means that it must work in the opposite direction from the valve in Fig. 2. In other words, when the temperature in the room has not reached the predetermined point, the valve 13 is open, being forced open by the spring 14, and the heating fluid passes up through the valve 6 by means of the passageway 10 and has free access to the flexible device 20ª, thus keeping the material on the exterior thereof expanded so as to hold the valve 6 open. When the temperature in the apartment reaches the predetermined point, the thermostat 17 expands and closes the valve 13. This shuts the steam off from the flexible device 20ª and the expansible material outside thereof cools and the spring 22 then moves the valve stem so as to close the valve 6.

It will be noted that by means of this construction we provide a self-contained controlling and regulating device which can be easily and quickly attached to an ordinary heater by simply removing a portion of the ordinary valve casing and leaving that portion containing the valve seat and then fastening the upper portion of the casing thereto, so as to complete the construction. This, therefore, provides a cheap, efficient, self-contained controlling and regulating device by means of which each heater is controlled independently of any other heater and independent of any outside apparatus or source of supply of material.

We claim:

1. A controlling and regulating device for heaters comprising a valve casing, a valve therein for controlling the admission of the heating fluid to the heater, a valve stem connected with said valve, a controlling element responsive to variations in temperature directly connected with said valve stem for moving it so as to move said valve, a portion of said valve casing being provided with a passageway, a connection between said passageway and the admission side of said valve so that the heating fluid may pass up into said passageway when said valve is closed or open, a controlling valve for said passageway, a thermostatic device mounted on said casing and responsive to variations in temperature of the apartment to be heated for controlling said controlling valve, said passageway leading to said controlling element so that when said latter valve is open the heating fluid acts upon said controlling element to cause the valve stem to be moved, a retracting device for said controlling element, said valve casing provided with a second passageway through which water of condensation returns, and a check valve for controlling said latter passageway.

2. A controlling and regulating device for heaters comprising a valve casing, a valve therein for controlling the admission of the heating fluid to the heater, a valve stem connected with said valve, a controlling element responsive to variations in temperature directly connected to said valve stem for moving it so as to move said valve, said valve stem provided with a passageway communicating with the admission side of said valve, said casing also provided with a passageway with which the passageway in the valve stem communicates, a thermostatic controlling device mounted on said casing for controlling said latter passageway responsive to variations in temperature of the apartment to be heated, means for directing the heating fluid from said passageway to said controlling element so as to actuate it to move said valve stem, whereby a self-contained regulating and controlling device is provided which may be attached to any ordinary heater.

3. A controlling and regulating device for heaters comprising a valve casing, a valve therein for controlling the admission of the heating fluid to the heater, a valve stem connected with said valve, a controlling element responsive to variations in temperature directly connected to said valve stem for moving it so as to move said valve, said valve stem provided with a passageway communicating with the admission side of said valve, said casing also provided with a passageway with which the passageway in the valve stem communicates, an elongated chamber in said casing with which both of said passageways communicate so that the two passageways are in communication during all the various positions of the valve stem, a thermostatic controlling device mounted on said casing for controlling said latter passageway responsive to variations in temperature of the apartment to be heated, means for directing the heating fluid from said passageway to said controlling element so as to actuate it to move said valve stem, whereby a self-contained regulating and controlling device is provided which may be attached to any ordinary heater.

4. A controlling and regulating device for heaters comprising a valve casing, a valve therein for controlling the admission of the heating fluid to the heater, a valve stem connected with said valve, a controlling element responsive to variations in temperature directly connected to said valve stem for moving it so as to move said valve, said valve stem provided with a passageway communicating with the admission side of said valve, said casing also provided with a passageway with which the passageway in the valve stem communicates, an elongated chamber in said casing with which both of said passageways communicate so that the two passageways are in communication during all the various positions of the valve stem, a valve supported by said valve casing for controlling said passageway, a thermostat mounted upon said valve casing for controlling said latter valve responsive to variations in temperature of the apartment to be heated, means for directing the heating fluid from said passageway to said controlling element so as to actuate it to move said valve stem, whereby a self-contained regulating and controlling device is provided which may be attached to any ordinary heater.

5. A controlling and regulating device for heaters comprising a valve casing, a valve therein for controlling the admission of the heating fluid to the heater, a valve stem connected with said valve, a controlling element responsive to variations in temperature directly connected with said valve stem for moving it so as to move said valve, a portion of said valve casing being provided with a passageway, a connection between said passageway and the admission side of said valve so that the heating fluid may pass up into said passageway when said valve is closed or open, a controlling valve for said passageway, a thermostatic device mounted on said casing and responsive to variations in temperature of the apartment to be heated for controlling said controlling valve, said passageway leading to said controlling element so that when said latter valve is open the heating fluid acts upon said controlling element to cause the valve stem to be moved, a retracting device for said controlling element, said valve casing provided with a second passageway through which water of condensation returns, and means for closing said latter passageway when the valve is open.

Signed at Chicago, county of Cook and State of Illinois, this 29th day of May, 1917.

JAMES McALEAR.
ERNEST W. RIESBECK.

In the presence of—
MARION INGRAHAM,
LYDIA M. SYLVARUS.